US011270050B1

(12) United States Patent
Kumar et al.

(10) Patent No.: US 11,270,050 B1
(45) Date of Patent: Mar. 8, 2022

(54) SYSTEM AND METHOD FOR REAL-TIME DETECTION OF DIRECT AND INDIRECT CONNECTIVITY SHORTS IN AN ELECTRONIC CIRCUIT DESIGN

(71) Applicant: Cadence Design Systems, Inc., San Jose, CA (US)

(72) Inventors: Hitesh Mohan Kumar, Greater Noida (IN); Anuj Jain, Greater Noida (IN); Sahil Vij, Haryana (IN); Abhimanyu Bhowmik, Assam (IN); Rahul Kumar, Greater Noida West (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/232,724

(22) Filed: Apr. 16, 2021

(51) Int. Cl.

| | |
|---|---|
| ***G06F 30/30*** | (2020.01) |
| ***G06F 30/31*** | (2020.01) |
| ***G06F 30/392*** | (2020.01) |
| ***G06F 30/337*** | (2020.01) |
| *G06F 119/06* | (2020.01) |
| *G06F 115/08* | (2020.01) |
| *G06F 111/12* | (2020.01) |
| *G06F 111/20* | (2020.01) |
| *G06F 111/02* | (2020.01) |

(52) U.S. Cl.
CPC ............ *G06F 30/31* (2020.01); *G06F 30/337* (2020.01); *G06F 30/392* (2020.01); *G06F 2111/02* (2020.01); *G06F 2111/12* (2020.01); *G06F 2111/20* (2020.01); *G06F 2115/08* (2020.01); *G06F 2119/06* (2020.01)

(58) Field of Classification Search
None
See application file for complete search history.

(56) References Cited

U.S. PATENT DOCUMENTS 7,971,178 B1 * 6/2011 Marwah .................. G06F 30/39 716/139
8,028,259 B2 * 9/2011 Phan Vogel .......... G06F 30/398 716/111
8,589,844 B2 * 11/2013 Muddu ................ G06F 30/398 716/111

* cited by examiner

*Primary Examiner* — Leigh M Garbowski
(74) *Attorney, Agent, or Firm* — Mark H. Whittenberger, Esq.; Holland & Knight LLP

(57) ABSTRACT

The present disclosure relates to a method for use with an electronic design. Embodiments may include displaying, at a graphical user interface, at least a portion of the electronic design and receiving a selection of a subcircuit at a first position of the graphical user interface. In response to a user input, embodiments may include transitioning the subcircuit from the first position to a second position of the graphical user interface and determining one or more direct and indirect connections resulting from a potential placement at the second position. Embodiments may include determining an influence metric by applying an optimized connectivity rules definition upon the potential placement at the second position and the one or more direct and indirect connections. Embodiments may also include displaying feedback at the graphical user interface based upon, at least in part, the influence metric.

20 Claims, 31 Drawing Sheets

Real-time user feedback

300

400

500

600

700

800

| Influence | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Rename of 2nd Object | Scalar Power/Ground | Unnamed scalar net | First | * | * | * | * | * |
| Rename of 2nd Object | Scalar Power/Ground | Unnamed scalar net | Vertex | * | * | * | * | * |
| Rename of 2nd Object | Scalar Power/Ground | Unnamed scalar net | Non-vertex | Vertex | * | * | * | * |
| Two names | Scalar Power/Ground | Named Scalar net | First | * | * | * | * | * |
| Two names | Scalar Power/Ground | Named Scalar net | Vertex | * | * | * | * | * |
| Two names | Scalar Power/Ground | Named Scalar net | Non-vertex | Vertex | * | * | * | * |
| Same Net | Scalar Power/Ground | Scalar Power/Ground | First | * | Same name | * | * | * |
| Same Net | Scalar Power/Ground | Scalar Power/Ground | Vertex | * | Same name | * | * | * |
| Same Net | Scalar Power/Ground | Scalar Power/Ground | Non-vertex | Vertex | Same name | * | * | * |
| Tap on 1st Object | Scalar Power/Ground | Named bus | Vertex | * | * | * | * | Different orientation |
| Tap on 1st Object | Scalar Power/Ground | NetGroup | Vertex | * | * | * | Parent | Different orientation |
| Tap on 1st Object | Scalar Power/Ground | NetGroup | Vertex | * | * | * | Unrelated | Different orientation |
| Normal | Scalar Power/Ground | Scalar pin | * | * | * | * | * | * |
| Normal | Scalar Power/Ground | Offpage | * | * | * | * | * | * |
| Normal | Scalar Power/Ground | Alias pin | * | Vertex | * | Same width | Unrelated | * |

FIG. 10

| Influence | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Rename of 2nd Object | NC | Unnamed scalar net | Vertex | * | * | * | * | * |
| Rename of 2nd Object | NC | Unnamed scalar net | Non-vertex | Vertex | * | * | * | * |
| Same Net | NC | NC | * | * | Same name | Same width | * | * |
| Normal | NC | Scalar pin | * | * | * | * | * | * |
| Normal | NC | Port | * | * | * | * | * | * |
| Normal | NC | Offpage | * | * | * | * | * | * |

| Object ( First object in row, second in column) | 1.5V Scalar Power | _N3 Unnamed Scalar | _N10 Unnamed Scalar | _N2 Unnamed Scalar | _N16 Unnamed Scalar | _N7 Unnamed Scalar | GND Scalar Ground |
|---|---|---|---|---|---|---|---|
| 1.5V Scalar Power | Same Net | Rename Second | Rename Second | Rename Second | Rename Second | Rename Second | Illegal |
| _N3 Unnamed Scalar | Rename First | Same Net | Rename Second | Rename First | Rename Second | Rename Second | Rename First |
| _N10 Unnamed Scalar | Rename First | Rename First | Same Net | Rename First | Rename Second | Rename First | Rename First |
| _N2 Unnamed Scalar | Rename First | Rename Second | Rename Second | Same Net | Rename Second | Rename Second | Rename First |
| _N16 Unnamed Scalar | Rename First | Rename First | Rename First | Rename First | Same Net | Rename First | Rename First |
| _N7 Unnamed Scalar | Rename First | Rename First | Rename Second | Rename First | Rename Second | Same Net | Rename First |
| GND Scalar Ground | Illegal | Rename Second | Rename Second | Rename Second | Rename Second | Rename Second | Same Net |

FIG. 15

| Connection/Shorting Type | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Normal | Unnamed scalar net | Unnamed scalar net | First | * | * | * | * | * |
| Normal | Unnamed scalar net | Unnamed scalar net | Vertex | * | * | * | * | * |
| Normal | Unnamed scalar net | Unnamed scalar net | Non-vertex | Vertex | * | * | * | * |
| Rename of 1st object | Unnamed scalar net | Named Scalar net | First | * | * | * | * | * |
| Rename of 1st object | Unnamed scalar net | Named Scalar net | Vertex | * | * | * | * | * |
| Rename of 1st object | Unnamed scalar net | Named Scalar net | Non-vertex | Vertex | * | * | * | * |
| Rename of 1st object | Unnamed scalar net | Scalar Power/Ground | First | * | * | * | * | * |
| Rename of 1st object | Unnamed scalar net | Scalar Power/Ground | Vertex | * | * | * | * | * |
| Rename of 1st object | Unnamed scalar net | Scalar Power/Ground | * | Vertex | * | * | * | * |
| Rename of 1st object | Unnamed scalar net | NC | * | * | * | * | * | * |
| Tap on 1st Object | Unnamed scalar net | Named bus | Vertex | * | * | * | * | Different orientation |
| Tap on 1st Object | Unnamed scalar net | NetGroup | Vertex | * | * | * | Parent | Different orientation |
| Tap on 1st Object | Unnamed scalar net | NetGroup | Vertex | * | * | * | Unrelated | Different orientation |
| Normal | Unnamed scalar net | Scalar pin | * | * | * | * | * | * |
| Scope change on 1st object | Unnamed scalar net | Port | * | * | * | * | * | * |
| Normal | Unnamed scalar net | Offpage | * | * | * | * | * | * |
| Normal | Unnamed scalar net | Alias pin | * | Vertex | * | Same width | Unrelated | * |

FIG. 20

| Connection/Shorting Type | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Rename of 2nd Object | Named Scalar net | Unnamed scalar net | First | * | * | * | * | * |
| Rename of 2nd Object | Named Scalar net | Unnamed scalar net | Vertex | * | * | * | * | * |
| Rename of 2nd Object | Named Scalar net | Unnamed scalar net | Non-vertex | Vertex | * | * | * | * |
| Same Net | Named Scalar net | Named Scalar net | First | * | Same name | * | * | * |
| Same Net | Named Scalar net | Named Scalar net | Vertex | * | Same name | * | * | * |
| Same Net | Named Scalar net | Named Scalar net | Non-vertex | Vertex | Same name | * | * | * |
| Two names | Named Scalar net | Scalar Power/Ground | First | * | * | * | * | * |
| Two names | Named Scalar net | Scalar Power/Ground | Vertex | * | * | * | * | * |
| Two names | Named Scalar net | Scalar Power/Ground | Non-vertex | Vertex | * | * | * | * |
| Tap on 1st Object | Named Scalar net | Named bus | Vertex | * | * | * | * | Different orientation |
| Tap on 1st Object | Named Scalar net | NetGroup | Vertex | * | * | * | Parent | Different orientation |
| Tap on 1st Object | Named Scalar net | NetGroup | Vertex | * | * | * | Unrelated | Different orientation |
| Normal | Named Scalar net | Scalar pin | * | * | * | * | * | * |
| Scope change on 1st object | Named Scalar net | Port | * | * | * | * | * | * |
| Normal | Named Scalar net | Offpage | * | * | * | * | * | * |
| Normal | Named Scalar net | Alias pin | * | Vertex | * | Same width | Unrelated | * |

FIG. 21

| Connection/Shorting Type | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| **Rename of 2nd Object** | Scalar Power/Ground | Unnamed scalar net | First | * | * | * | * | * |
| **Rename of 2nd Object** | Scalar Power/Ground | Unnamed scalar net | Vertex | * | * | * | * | * |
| **Rename of 2nd Object** | Scalar Power/Ground | Unnamed scalar net | Non-vertex | Vertex | * | * | * | * |
| **Two names** | Scalar Power/Ground | Named Scalar net | First | * | * | * | * | * |
| **Two names** | Scalar Power/Ground | Named Scalar net | Vertex | * | * | * | * | * |
| **Two names** | Scalar Power/Ground | Named Scalar net | Non-vertex | Vertex | * | * | * | * |
| **Same Net** | Scalar Power/Ground | Scalar Power/Ground | First | * | Same name | * | * | * |
| **Same Net** | Scalar Power/Ground | Scalar Power/Ground | Vertex | * | Same name | * | * | * |
| **Same Net** | Scalar Power/Ground | Scalar Power/Ground | Non-vertex | Vertex | Same name | * | * | * |
| **Tap on 1st Object** | Scalar Power/Ground | Named bus | Vertex | * | * | * | * | Different orientation |
| **Tap on 1st Object** | Scalar Power/Ground | NetGroup | Vertex | * | * | * | Parent | Different orientation |
| **Tap on 1st Object** | Scalar Power/Ground | NetGroup | Vertex | * | * | * | Unrelated | Different orientation |
| **Normal** | Scalar Power/Ground | Scalar pin | * | * | * | * | * | * |
| **Normal** | Scalar Power/Ground | Offpage | * | * | * | * | * | * |
| **Normal** | Scalar Power/Ground | Alias pin | * | Vertex | * | Same width | Unrelated | * |

FIG. 22

| Connection/Shorting Type | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Rename of 2nd Object | NC | Unnamed scalar net | Vertex | * | * | * | * | * |
| Rename of 2nd Object | NC | Unnamed scalar net | Non-vertex | Vertex | * | * | * | * |
| Same Net | NC | NC | * | * | Same name | Same width | * | * |
| Normal | NC | Scalar pin | * | * | * | * | * | * |
| Normal | NC | Port | * | * | * | * | * | * |
| Normal | NC | Offpage | * | * | * | * | * | * |

FIG. 23

| Connection/Shorting Type | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Tap on 1st Object | Unnamed bus | Named bus | Vertex | * | * | Same width | * | Different orientation |
| Tap on 1st Object | Unnamed bus | Named bus | Vertex | * | * | More width | * | Different orientation |
| Rename of 1st object | Unnamed bus | Named bus | First | * | * | * | * | * |
| Tap on 1st Object | Unnamed bus | NetGroup | Vertex | * | * | * | Parent | Different orientation |
| Tap on 1st Object | Unnamed bus | NetGroup | Vertex | * | * | * | Unrelated | Different orientation |
| Normal | Unnamed bus | Vector pin | Vertex | Vertex | * | Same width | * | * |
| Normal | Unnamed bus | Vector pin | Non-vertex | Vertex | * | Same width | * | * |
| Width change of 1st object | Unnamed bus | Vector pin | First | Vertex | * | * | * | * |
| Normal | Unnamed bus | Alias pin | * | Vertex | * | Same width | Unrelated | * |
| Width change of 1st object | Unnamed bus | Alias pin | First | Vertex | * | Same width | Unrelated | * |
| Scope change on 1st object | Unnamed bus | Port | * | Vertex | * | * | * | * |
| Normal | Unnamed bus | Offpage | * | Vertex | * | * | * | * |

FIG. 24

| Connection/Shorting Type | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Tap on 2nd Object | Named bus | Unnamed scalar net | * | Vertex | * | * | * | Different orientation |
| Tap on 2nd Object | Named bus | Named Scalar net | * | Vertex | * | * | * | Different orientation |
| Tap on 2nd Object | Named bus | Scalar Power/Ground | * | Vertex | * | * | * | Different orientation |
| Tap on 2nd Object | Named bus | Unnamed bus | * | Vertex | * | Less width | * | Different orientation |
| Tap on 2nd Object | Named bus | Unnamed bus | * | Vertex | * | Same width | * | Different orientation |
| Same Net | Named bus | Named bus | Vertex | * | Same name | Same width | * | * |
| Same Net | Named bus | Named bus | First | * | Same name | Same width | * | * |
| Same Net | Named bus | Named bus | * | Vertex | Same name | Same width | * | * |
| Tap on 1st Object | Named bus | Named bus | Vertex | * | * | More width | * | Different orientation |
| Tap on 1st Object | Named bus | Named bus | Vertex | * | Different name | Same width | * | Different orientation |
| Tap on 2nd Object | Named bus | Named bus | * | Vertex | * | Less width | * | Different orientation |
| Tap on 2nd Object | Named bus | Named bus | Non-vertex | Vertex | Different name | Same width | * | Different orientation |
| Tap on 1st Object | Named bus | NetGroup | Vertex | * | * | * | Parent | Different orientation |
| Tap on 1st Object | Named bus | NetGroup | Vertex | * | * | * | Unrelated | Different orientation |
| Scope change on 1st object | Named bus | Port | * | Vertex | * | * | * | * |
| Normal | Named bus | Offpage | * | Vertex | * | * | * | * |
| Normal | Named bus | Vector pin | * | Vertex | * | Same width | * | * |
| Normal | Named bus | Alias pin | * | Vertex | * | Same width | Unrelated | * |

FIG. 25

| Connection/Shorting Type | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Tap on 2nd Object | NetGroup | Unnamed scalar net | * | Vertex | * | * | Child | Different orientation |
| Tap on 2nd Object | NetGroup | Unnamed scalar net | * | Vertex | * | * | Unrelated | Different orientation |
| Tap on 2nd Object | NetGroup | Named Scalar net | * | Vertex | * | * | Child | Different orientation |
| Tap on 2nd Object | NetGroup | Named Scalar net | * | Vertex | * | * | Unrelated | Different orientation |
| Tap on 2nd Object | NetGroup | Scalar Power/Ground | * | Vertex | * | * | Child | Different orientation |
| Tap on 2nd Object | NetGroup | Scalar Power/Ground | * | Vertex | * | * | Unrelated | Different orientation |
| Tap on 2nd Object | NetGroup | Named bus | * | Vertex | * | * | Child | Different orientation |
| Tap on 2nd Object | NetGroup | Named bus | * | Vertex | * | * | Unrelated | Different orientation |
| Same Net | NetGroup | NetGroup | Vertex | * | Same name | * | * | * |
| Tap on 1st Object | NetGroup | NetGroup | Vertex | * | Different name | * | Parent | Different orientation |
| Tap on 1st Object | NetGroup | NetGroup | Vertex | * | Different name | * | Unrelated | Different orientation |
| Normal | NetGroup | PortGroup | * | Vertex | * | * | Same membership | * |
| Normal | NetGroup | PortGroup | * | Vertex | * | * | No Netgroup membership | * |
| Normal | NetGroup | PortGroup | First | Vertex | * | * | No Netgroup membership | * |

FIG. 26

| Connection/Shorting Type | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Normal | Scalar pin | Unnamed scalar net | Vertex | * | * | * | * | * |
| Normal | Scalar pin | Named Scalar net | Vertex | * | * | * | * | * |
| Normal | Scalar pin | Scalar Power/Ground | Vertex | * | * | * | * | * |
| Normal | Scalar pin | NC | Vertex | * | * | * | * | * |
| Normal | Scalar pin | Scalar pin | Vertex | Vertex | * | * | * | * |
| Normal | Scalar pin | Port | Vertex | Vertex | * | * | * | * |
| Normal | Scalar pin | Offpage | Vertex | Vertex | * | * | * | * |
| Normal | Scalar pin | Alias pin | Vertex | Vertex | * | Same width | Unrelated | * |

FIG. 27

| Connection/Shorting Type | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Scope change on 2nd object | Port | Unnamed scalar net | Vertex | * | * | * | * | * |
| Scope change on 2nd object | Port | Named Scalar net | Vertex | * | * | * | * | * |
| Normal | Port | NC | Vertex | * | * | * | * | * |
| Normal | Port | Scalar pin | Vertex | Vertex | * | * | * | * |
| Normal | Port | Port | Vertex | Vertex | * | * | * | * |
| Normal | Port | Offpage | Vertex | Vertex | * | * | * | * |
| Normal | Port | Alias pin | Vertex | Vertex | * | Same width | Unrelated | * |
| Scope change on 2nd object | Port | Named bus | Vertex | * | * | * | * | * |
| Scope change on 2nd object | Port | Unnamed bus | Vertex | * | * | * | * | * |
| Normal | Port | Vector pin | Vertex | Vertex | * | * | * | * |
| Normal | Port | Alias pin | Vertex | Vertex | * | Same width | Unrelated | * |

FIG. 28

| Connection/Shorting Type | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Normal | Offpage | Unnamed scalar net | Vertex | * | * | * | * | * |
| Normal | Offpage | Named Scalar net | Vertex | * | * | * | * | * |
| Normal | Offpage | Scalar Power/Ground | Vertex | * | * | * | * | * |
| Normal | Offpage | NC | Vertex | * | * | * | * | * |
| Normal | Offpage | Scalar pin | Vertex | Vertex | * | * | * | * |
| Normal | Offpage | Port | Vertex | Vertex | * | * | * | * |
| Normal | Offpage | Offpage | Vertex | Vertex | * | * | * | * |
| Normal | Offpage | Alias pin | Vertex | Vertex | * | Same width | Unrelated | * |
| Normal | Offpage | Named bus | Vertex | * | * | * | * | * |
| Normal | Offpage | Unnamed bus | Vertex | * | * | * | * | * |
| Normal | Offpage | Vector pin | Vertex | Vertex | * | * | * | * |
| Normal | Offpage | Alias pin | Vertex | Vertex | * | Same width | Unrelated | * |

FIG. 29

| Connection/Shorting Type | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Normal | Vector pin | Unnamed bus | Vertex | * | * | Same width | * | * |
| Normal | Vector pin | Named bus | Vertex | * | * | Same width | * | * |
| Normal | Vector pin | Vector pin | Vertex | Vertex | * | Same width | * | * |
| Normal | Vector pin | Port | Vertex | Vertex | * | * | * | * |
| Normal | Vector pin | Offpage | Vertex | Vertex | * | * | * | * |
| Normal | Vector pin | Alias pin | Vertex | Vertex | * | Same width | Unrelated | * |

FIG. 30

| Connection/Shorting Type | First Object | Second Object | 1st Object Point Type | 2nd Object Point Type | Name Type (2nd vs 1st) | Width Type (2nd vs 1st) | Relationship Type (2nd vs 1st) | Orientation Type (2nd vs 1st) |
|---|---|---|---|---|---|---|---|---|
| Normal | Alias pin | Unnamed scalar net | Vertex | * | * | Same width | Unrelated | * |
| Normal | Alias pin | Named Scalar net | Vertex | * | * | Same width | Unrelated | * |
| Normal | Alias pin | Scalar Power/Ground | Vertex | * | * | Same width | Unrelated | * |
| Normal | Alias pin | Unnamed bus | Vertex | * | * | Same width | Unrelated | * |
| Normal | Alias pin | Named bus | Vertex | * | * | Same width | Unrelated | * |
| Normal | Alias pin | Scalar pin | Vertex | Vertex | * | Same width | Unrelated | * |
| Normal | Alias pin | Port | Vertex | Vertex | * | Same width | Unrelated | * |
| Normal | Alias pin | Offpage | Vertex | Vertex | * | Same width | Unrelated | * |
| Normal | Alias pin | Vector pin | Vertex | Vertex | * | Same width | Unrelated | * |
| Normal | Alias pin | Alias pin | Vertex | Vertex | * | Same width | Unrelated | * |

FIG. 31

SYSTEM AND METHOD FOR REAL-TIME DETECTION OF DIRECT AND INDIRECT CONNECTIVITY SHORTS IN AN ELECTRONIC CIRCUIT DESIGN

FIELD OF THE INVENTION

The embodiments of the present disclosure relate to a method of electronic circuit design, and more particularly, to a method for displaying potential shorts in an electronic circuit design.

BACKGROUND

Electronic design automation (EDA) tools exist currently and allow circuit designers to make changes to a given circuit design at a graphical user interface (GUI). In many situations, when a designer moves a circuit or portion of a circuit to a new position it may create shorted connections within the design. Currently, the lack of correct and real-time feedback to the designer, prior to operation completion, leads to accidental mistakes committed by circuit designer, which may result in huge productivity and design/data integrity loss. Existing tools attempt to identify such design issues through a design rules check (DRC) process. The DRC may then provide an error/warning to the user, however, this occurs after the erroneous connections have been made or attempted to be made by the associated evaluation engines.

SUMMARY

Accordingly, an embodiment of the present disclosure is directed to a computer-implemented method for use with an electronic design. The method may include displaying, at a graphical user interface, at least a portion of the electronic design and receiving a selection of a subcircuit at a first position of the graphical user interface. In response to a user input, the method may include transitioning the subcircuit from the first position to a second position of the graphical user interface and determining one or more direct and indirect connections resulting from a potential placement at the second position. The method may include determining an influence metric by applying an optimized connectivity rules definition upon the potential placement at the second position and the one or more direct and indirect connections. The method may also include displaying feedback at the graphical user interface based upon, at least in part, the influence metric.

One or more of the following features may be included. In some embodiments, displaying may occur before placement at the second position is finalized. The influence metric may be associated with an influence matrix. The influence matrix may be determined by applying the optimized connectivity rules definition on a circuit connectivity graph. The optimized connectivity rules definition may be based upon, at least in part, one or more object types and one or more object characteristics. The circuit connectivity graph may include all objects and connections involved in the transitioning of the subcircuit. The feedback may include a valid placement notification or an invalid placement notification.

In another embodiment of the present disclosure a computer-readable storage medium having stored thereon instructions, which when executed by a processor result in a number of operations is provided. Operations may include displaying, at a graphical user interface, at least a portion of the electronic design and receiving a selection of a subcircuit at a first position of the graphical user interface. In response to a user input, operations may include transitioning the subcircuit from the first position to a second position of the graphical user interface and determining one or more direct and indirect connections resulting from a potential placement at the second position. Operations may include determining an influence metric by applying an optimized connectivity rules definition upon the potential placement at the second position and the one or more direct and indirect connections. Operations may also include displaying feedback at the graphical user interface based upon, at least in part, the influence metric.

One or more of the following features may be included. In some embodiments, displaying may occur before placement at the second position is finalized. The influence metric may be associated with an influence matrix. The influence matrix may be determined by applying the optimized connectivity rules definition on a circuit connectivity graph. The optimized connectivity rules definition may be based upon, at least in part, one or more object types and one or more object characteristics. The circuit connectivity graph may include all objects and connections involved in the transitioning of the subcircuit. The feedback may include a valid placement notification or an invalid placement notification.

In yet another embodiment of the present disclosure a computing system for use in an electronic circuit design is provided. The system may include at least one processor and a graphical user interface that displays at least a portion of the electronic design and receives a selection of a subcircuit at a first position of the graphical user interface. In response to a user input, the at least one processor may transition the subcircuit from the first position to a second position of the graphical user interface. The at least one processor may determine one or more direct and indirect connections resulting from a potential placement at the second position. The at least one processor may determine an influence metric by applying an optimized connectivity rules definition upon the potential placement at the second position and the one or more direct and indirect connections. The at least one processor may generate feedback that is displayed at the graphical user interface based upon, at least in part, the influence metric.

One or more of the following features may be included. In some embodiments, displaying may occur before placement at the second position is finalized. The influence metric may be associated with an influence matrix. The influence matrix may be determined by applying the optimized connectivity rules definition on a circuit connectivity graph. The optimized connectivity rules definition may be based upon, at least in part, one or more object types and one or more object characteristics. The circuit connectivity graph may include all objects and connections involved in the transitioning of the subcircuit. The feedback may include a valid placement notification or an invalid placement notification.

It is to be understood that both the foregoing general description and the following detailed description are exemplary and explanatory and are intended to provide further explanation of embodiments of the present disclosure as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 10 is an optimized connectivity rules definition matrix according to an embodiment of the present disclosure;

FIG. 11 is an optimized connectivity rules definition matrix according to an embodiment of the present disclosure;

FIG. 15 is an illustration of an influence matrix of a display process according to an embodiment of the present disclosure;

FIG. 20 is an illustration of a connectivity rules table of a display process according to an embodiment of the present disclosure;

FIG. 21 is an illustration of a connectivity rules table of a display process according to an embodiment of the present disclosure;

FIG. 22 is an illustration of a connectivity rules table of a display process according to an embodiment of the present disclosure;

FIG. 23 is an illustration of a connectivity rules table of a display process according to an embodiment of the present disclosure;

FIG. 24 is an illustration of a connectivity rules table of a display process according to an embodiment of the present disclosure;

FIG. 25 is an illustration of a connectivity rules table of a display process according to an embodiment of the present disclosure;

FIG. 26 is an illustration of a connectivity rules table of a display process according to an embodiment of the present disclosure;

FIG. 27 is an illustration of a connectivity rules table of a display process according to an embodiment of the present disclosure;

FIG. 28 is an illustration of a connectivity rules table of a display process according to an embodiment of the present disclosure;

FIG. 29 is an illustration of a connectivity rules table of a display process according to an embodiment of the present disclosure;

FIG. 30 is an illustration of a connectivity rules table of a display process according to an embodiment of the present disclosure; and FIG. 31 is an illustration of a connectivity rules table of a display process according to an embodiment of the present disclosure.

DETAILED DESCRIPTION

Figure 1:
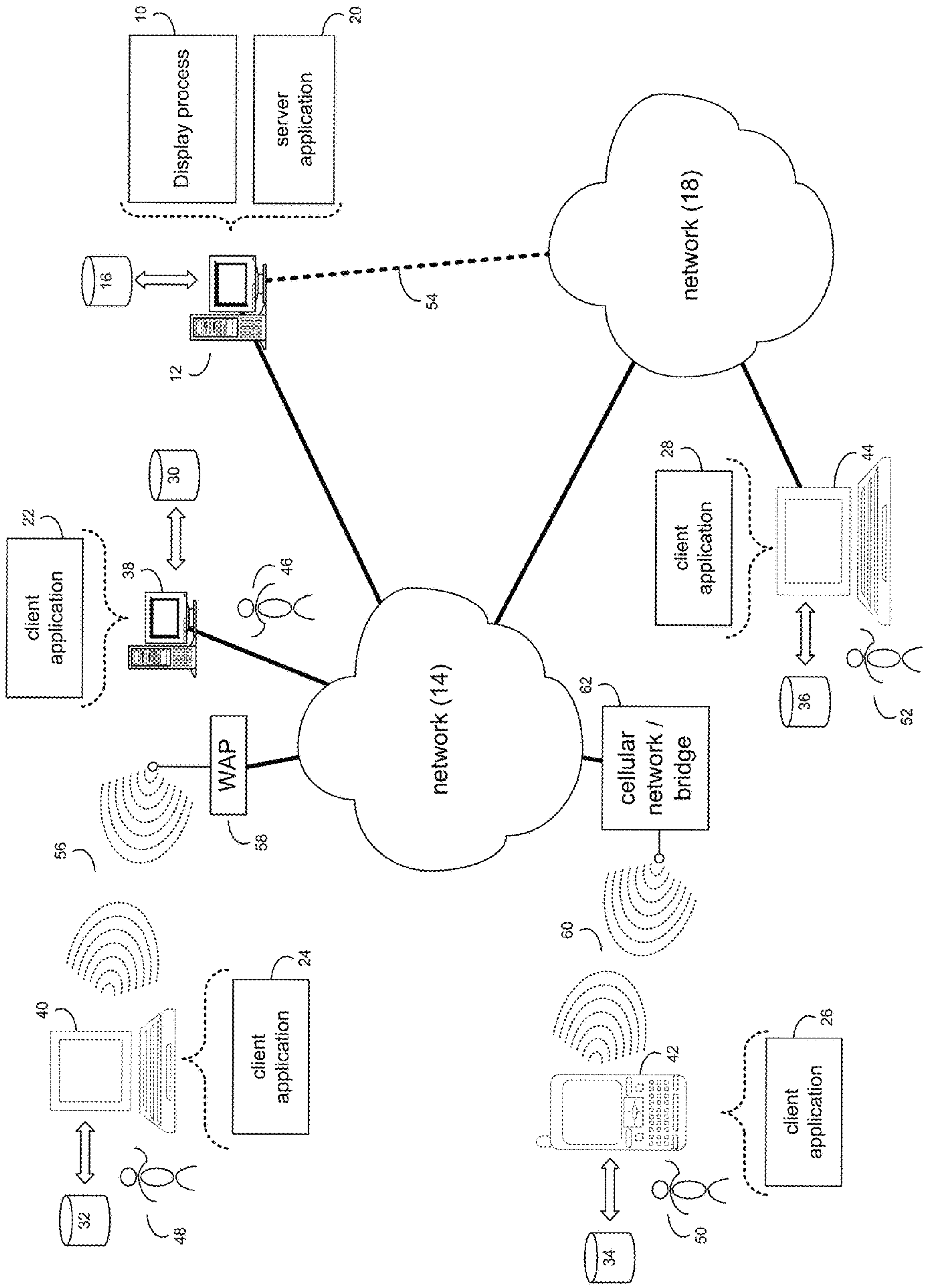
FIG. 1 diagrammatically depicts a display process coupled to a distributed computing network.

Embodiments included herein are directed towards a system and method for "real-time" detection and feedback of connectivity shorts associated with an electronic design, which may be provided before performing the actual evaluation for complex and/or dense circuits. Embodiments included herein may be configured to work on both direct and indirect connection cases arising due to multiple simultaneous connections happening. Computational complexity increases multi-fold due to multiple simultaneous connections occurring which have both direct and indirect influence. In existing systems, the lack of correct and real-time feedback before a particular operation is completed leads to accidental mistakes committed by circuit designer, which may result in huge productivity and design/data integrity losses.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity Like reference numerals in the drawings denote like elements.

Referring to FIG. 1, there is shown display process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, the display process may reside on a client electronic device, such as a personal computer, notebook computer, personal digital The instruction sets and subroutines of display process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute display process 10. Examples of client applications 22, 24, 26, 28 may include, but are not limited to, design verification tools such as those available from the assignee of the present disclosure. These applications may also be executed by server computer 12. In some embodiments, display process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the display process may be a client-side application (not shown) residing on one or more client electronic devices 38, 40, 42, 44 (e.g., stored on storage devices 30, 32, 34, 36, respectively). As such, the display process may be a stand-alone application that interfaces with a client application (e.g., client applications 22, 24, 26, 28), or may be an applet/application that is executed within a client application. As such, the display process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, display process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

Figure 2:
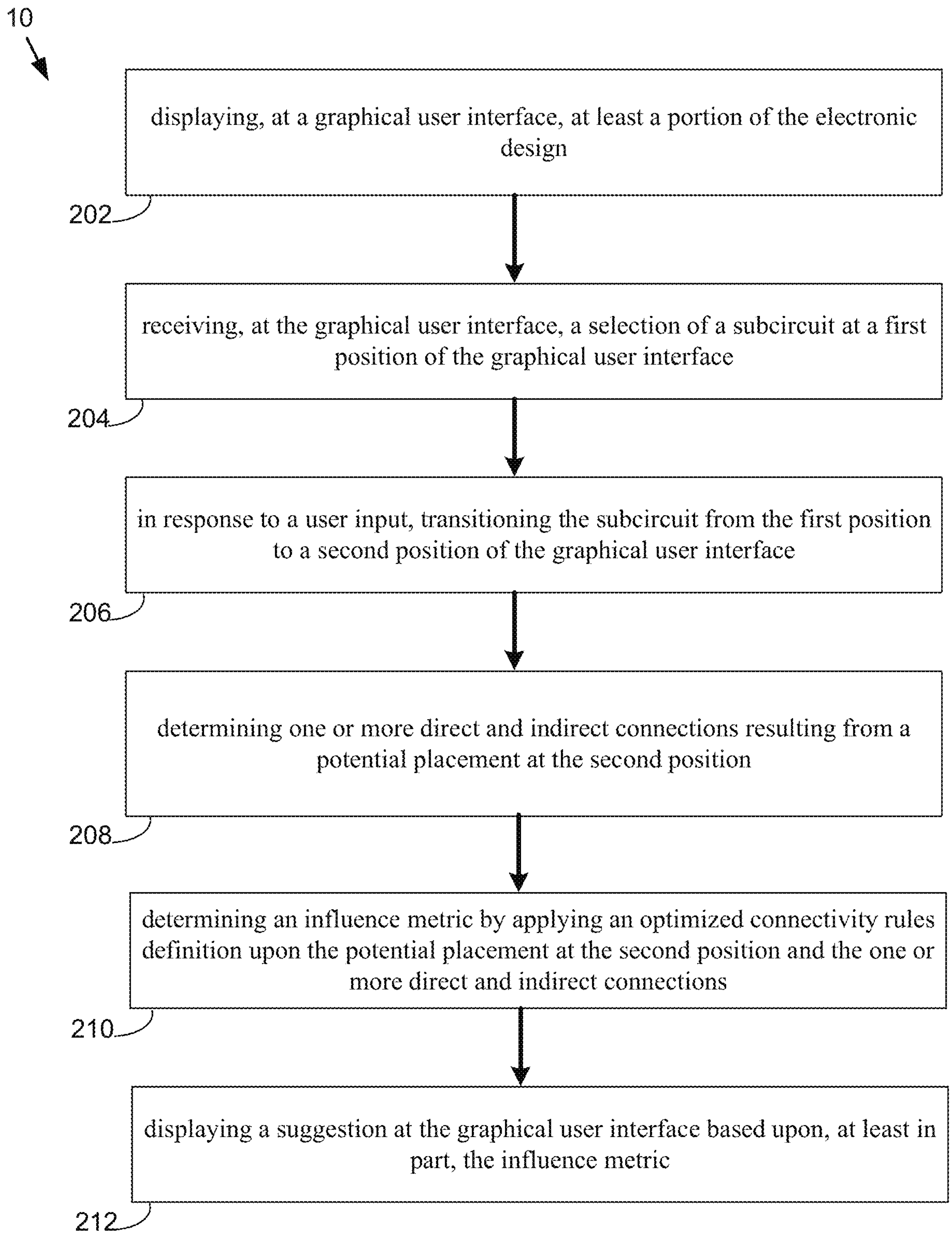
FIG. 2 is an exemplary flowchart of a display process according to an embodiment of the present disclosure.

Referring now to FIG. 2, a flowchart depicting an embodiment consistent with display process 10 is provided. The method may include displaying 202, at a graphical user interface, at least a portion of the electronic design and receiving 204 a selection of a subcircuit at a first position of the graphical user interface. In response to a user input, the method may include transitioning 206 the subcircuit from the first position to a second position of the graphical user interface and determining 208 one or more direct and indirect connections resulting from a potential placement at the second position. The method may include determining 210 an influence metric by applying an optimized connectivity rules definition upon the potential placement at the second position and the one or more direct and indirect connections. The method may also include displaying 212 feedback at the graphical user interface based upon, at least in part, the influence metric. Numerous other operations are also within the scope of the present disclosure as provided in further detail hereinbelow.

The term "subcircuit", as used herein, may refer to any subportion of a larger electronic circuit design. The phrase "direct connection", as used herein, may refer to two elements (parts) of a subcircuit or two subcircuits connected directly. The phrase "indirect connection", as used herein, may refer to, two elements of a subcircuit connected indirectly through a number of intermediate elements between them and also elements not connected graphically but only logically, such as by name or through a common attribute. The phrase "optimized connectivity rules definition" may refer to the minimal set of rules definition that is required to compute the exact inference of directly or indirectly connected elements.

Figure 3:
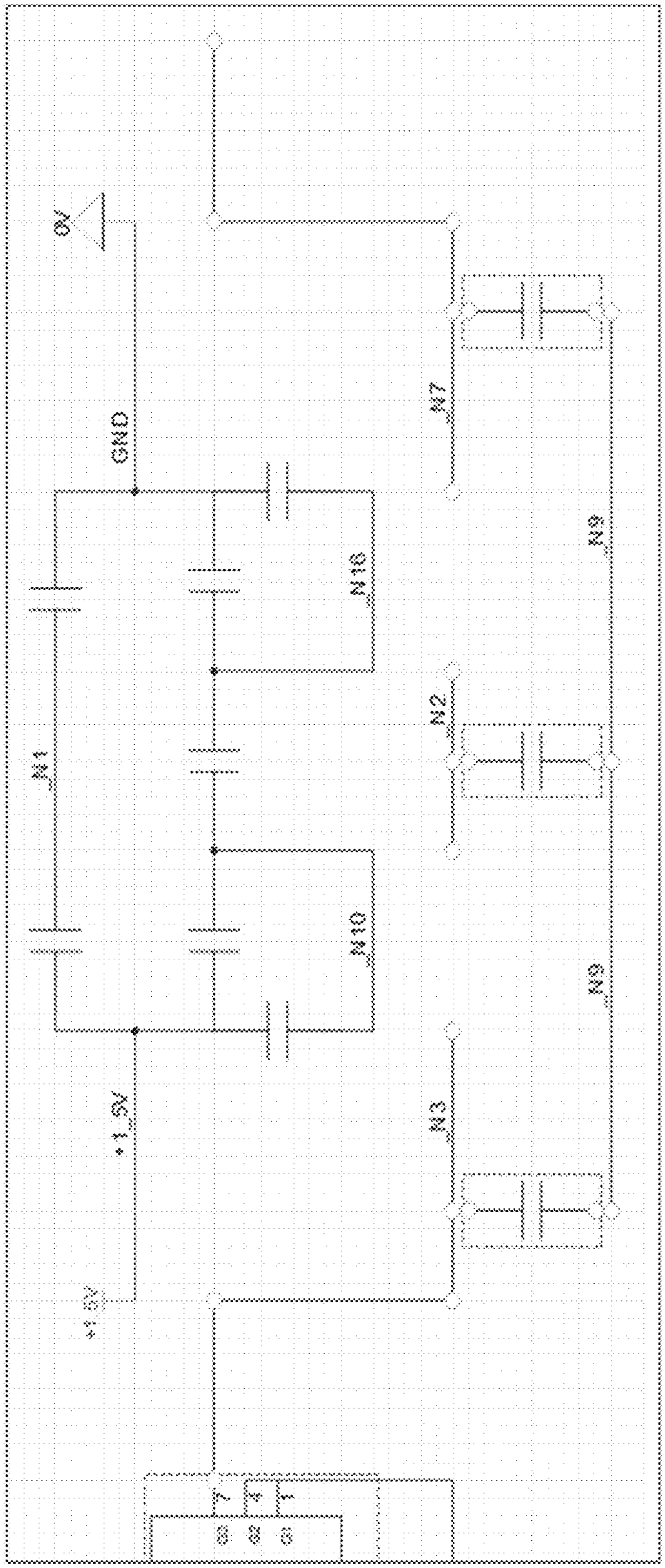
FIG. 3 is an illustration of a schematic of a display process according to an embodiment of the present disclosure.
Figure 4:
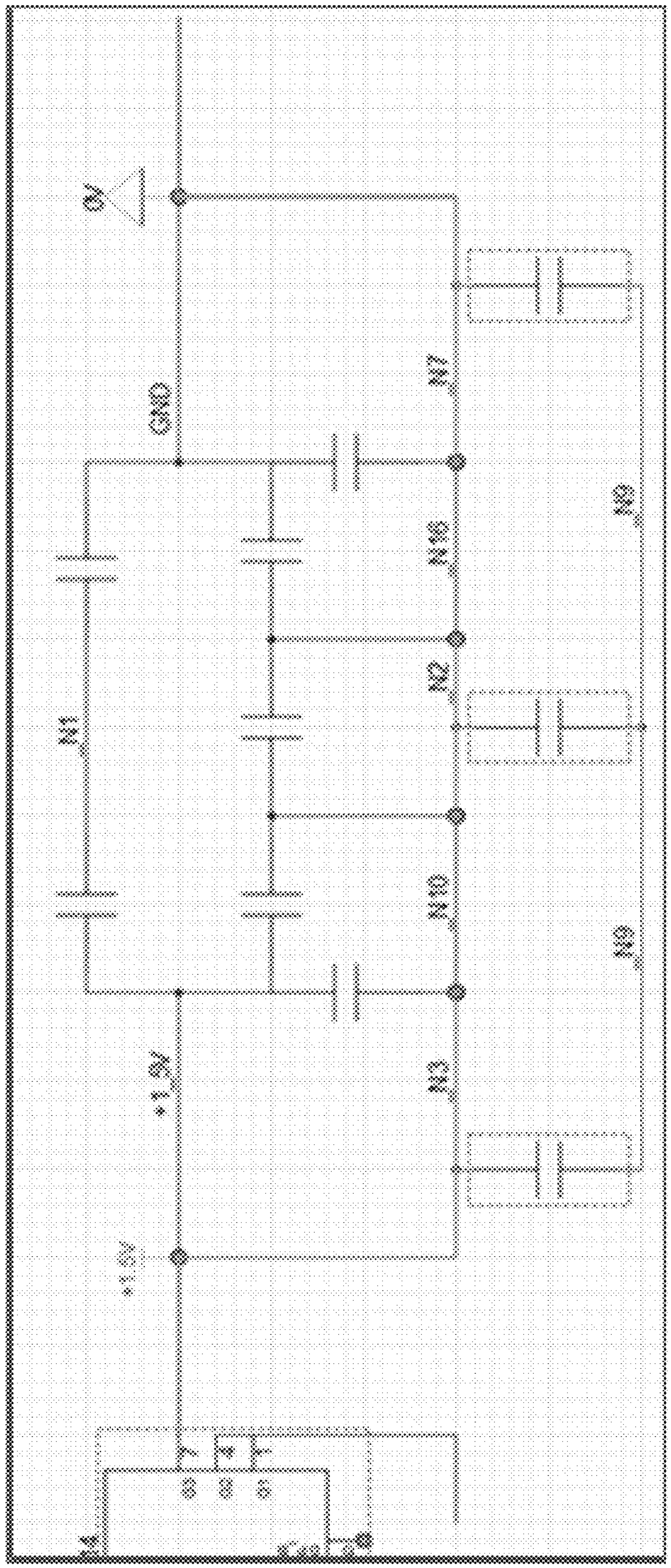
FIG. 4 is an illustration of a schematic of a display process according to an embodiment of the present disclosure.
Figure 5:
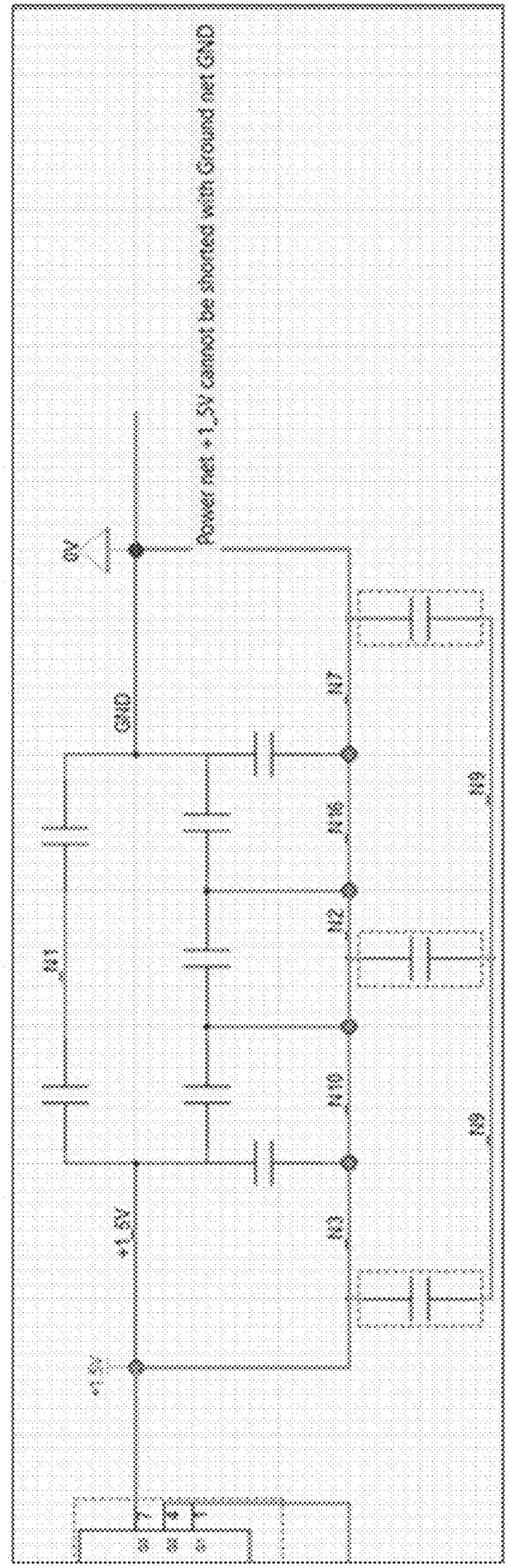
FIG. 5 is an illustration of a schematic of a display process according to an embodiment of the present disclosure.

Referring now to FIGS. 3-5, a plurality of schematics 300, 400, 500 showing examples consistent with embodiments of display process 10 are provided. FIG. 3 shows in initial circuit diagram, FIG. 4 shows a circuit diagram showing a lack of correct detection and correct feedback, and FIG. 5 shows an example providing real-time detection and correct feedback in accordance with display process 10. These examples depict accidental power and/or ground shorting when multiple nets are merged together.

In this particular example, the intention of the designer is to move the selected circuit in FIG. 4 up to short with the already placed (unselected) circuit. The already placed circuit has a power (1.5V) and a ground (0V) net. The power and ground must never be shorted together as it would create a fatal design failure. However, when the designer is moving the selected circuit up, that may leading to shorting between power and ground through a level of indirection (e.g., 1.5V→_N3→_N10→_N2→_N16→_N7→0V).

In operation, EDA application 20 may immediately provide a visual indication displaying an error to the designer as shown in FIG. 5 before he/she accidentally drops the circuit there as shown in FIG. 4. This level of indirect connection can be of any depth involves complex validations. Computing such indirect connectivity issues in real-time, particularly for very complex cases is very challenging.

Figure 6:
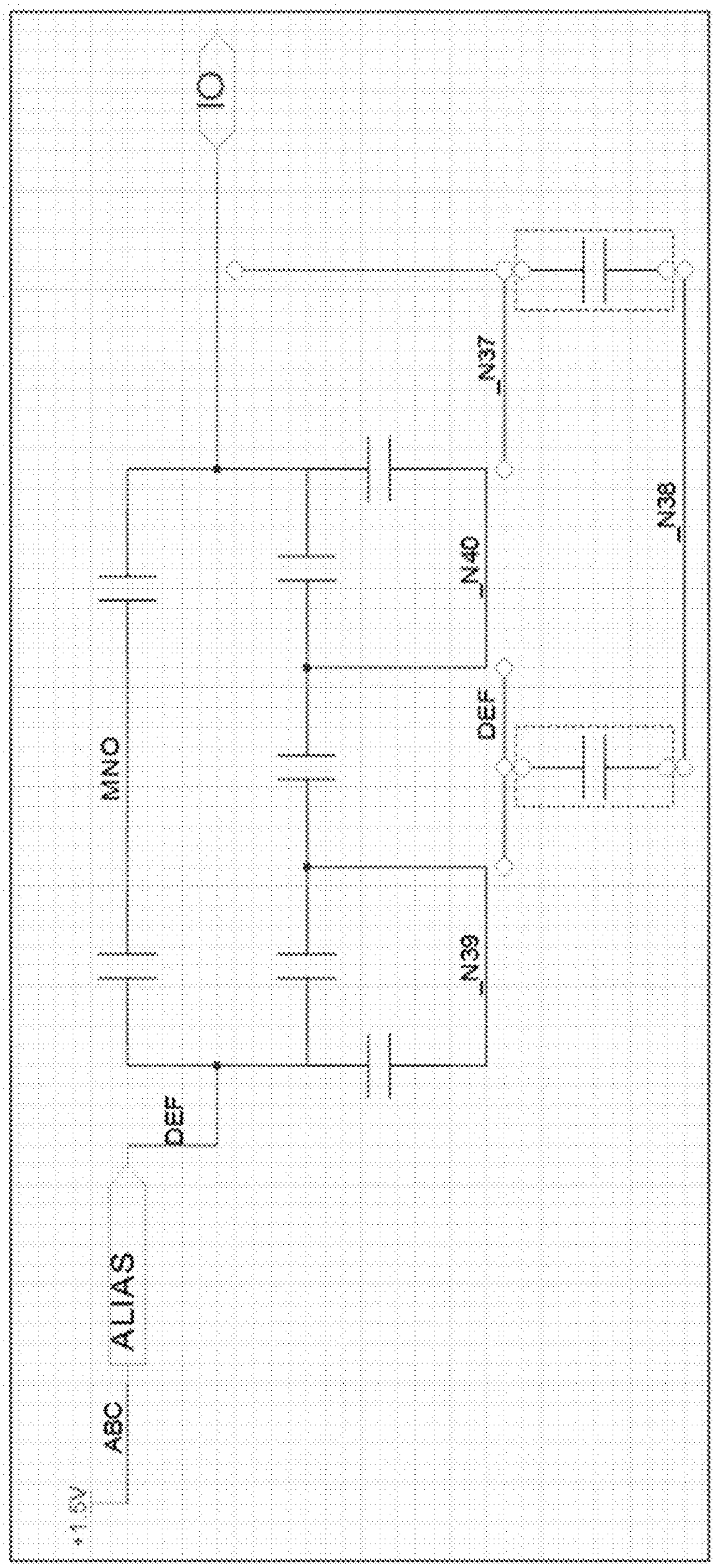
FIG. 6 is an illustration of a schematic of a display process according to an embodiment of the present disclosure.
Figure 7:
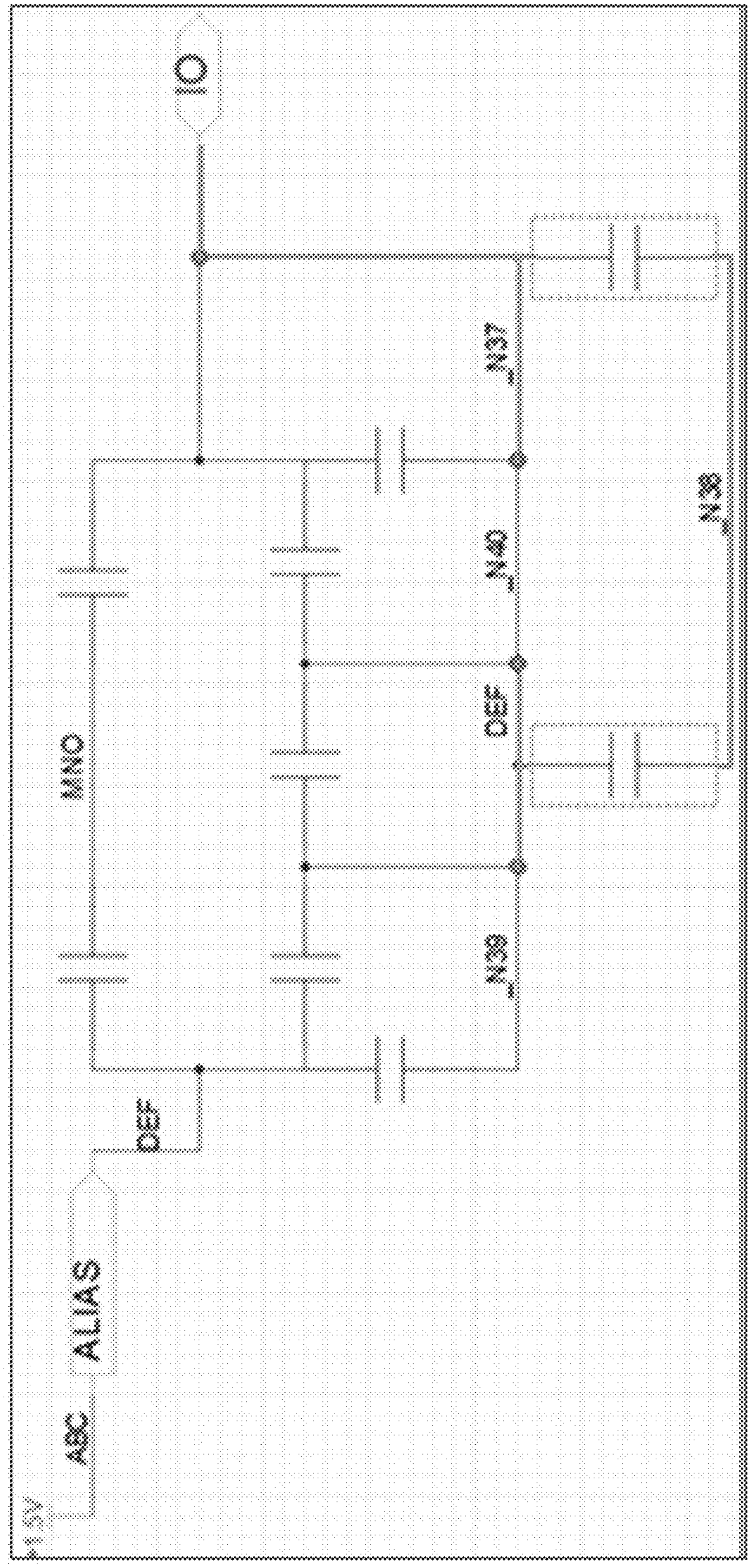
FIG. 7 is an illustration of a schematic of a display process according to an embodiment of the present disclosure.
Figure 8:
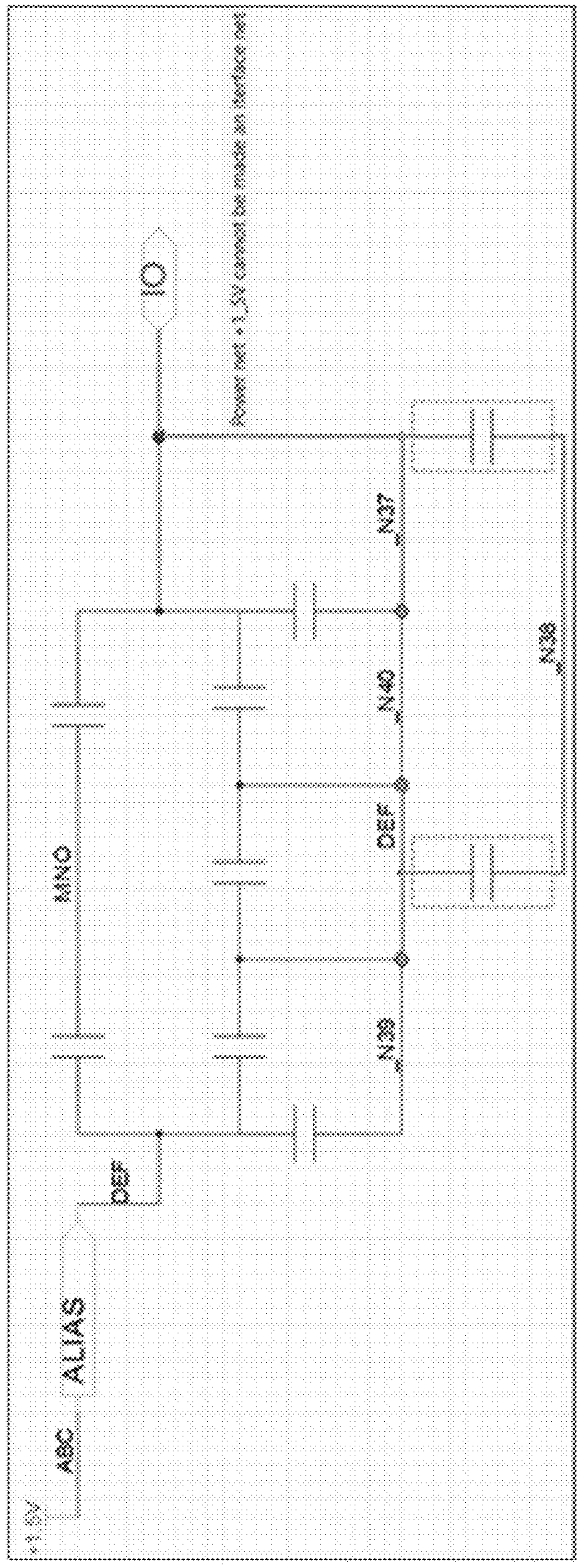
FIG. 8 is an illustration of a schematic of a display process according to an embodiment of the present disclosure.

Referring now to FIGS. 6-8, a plurality of schematics 600, 700, 800 showing examples consistent with embodiments of display process 10 are provided. FIG. 6 shows in initial circuit diagram, FIG. 7 shows a circuit diagram showing a lack of correct detection and feedback, and FIG. 8 shows an example providing real-time detection and correct feedback in accordance with display process 10. These example depict multiple nets being merged together to generate an incorrect power/interface net connection.

In operation, the intention of the designer is to move the selected circuit in FIG. 6 up to short with the already placed (unselected) circuit. The already placed circuit has a power (1.5V) and an interface net. The power cannot short with interface port through any level of indirect connection (e.g., 1.5V→ABC→DEF→_N40→_N37→IO).

In operation, EDA application 20 may immediately give an error to the designer as shown in FIG. 7 before he/she accidentally drops the circuit there as shown in FIG. 6. This level of indirect connection may be of any depth and may employ various levels and involve complex validations. Computing such indirect connectivity issues in real-time, particularly for very complex cases is very challenging.

Figure 9:
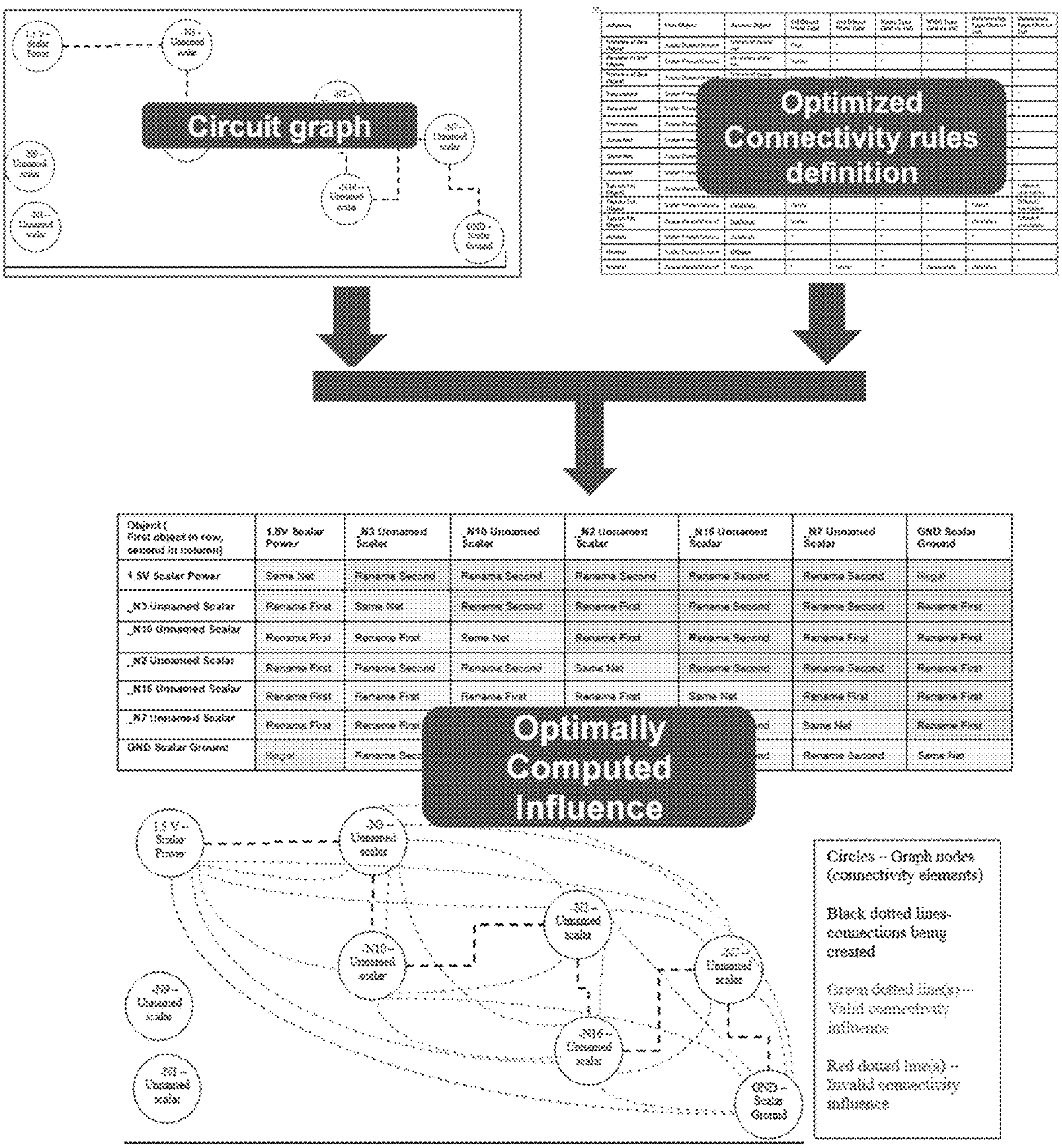
FIG. 9 is an illustration of a schematic showing a circuit graph, optimized connectivity rules definition, and optimally computed influence according to an embodiment of the present disclosure.

Referring now to FIG. 9, embodiments of display process 10 may provide for the real-time computation of connectivity shorts for all direct and indirect connections associated with a particular operation. In some embodiments, display process 10 may apply an optimized connectivity rules definition on the circuit for all direct and indirect new connections to determine an influence metric. As used herein, the term "influence" may refer to the connection impact of one object on another object based on their relative characteristics. A resultant influence may be computed based on precedence for one set of connected objects. When determining influence, objects in-operation as well as all other unchanging objects may be taken into consideration.

In some embodiments, display process 10 may utilize a flattened matrix/table as a connectivity rules definition input, a graph for circuit input, a flattened matrix/table for influence output, one or more object types (e.g., scalar net, vector net (bus), netgroup, pin, portgroup, power, ground, noconnect, bustap, alias, offpage connector, block pin, port, etc.), and/or one or more characteristics (is name different, is width different, is vertex or non-vertex or first connection point, is parent-child, is same orientation, etc.). The scalar net, vector net (bus) and netgroup object types may refer to the different types of nets in the schematic. The pin and portgroup object types may refer to different types of pins in the schematic. The power and ground object types may refer to power source elements in the schematic circuit. The noconnect may refer to a circuit element which can signify any unconnected pin as a valid state. The bustap object may refer to the connection between a vector net(bus) and scalar. The alias object may refer to an object to connect two nets. The offpage connector and port may refer to the objects that can traverse nets across schematic sheets or hierarchies. The characteristic "is name different" may refer to a characteristic where the name of two objects is different. The characteristic "is width different" may refer to a characteristic where the member size of two objects is different. The characteristic "is vertex or non-vertex or first connection point" may refer to a characteristic of the graphical position of the objects. The characteristic "is parent-child" may refer to the parent-child membership of the objects. The characteristic "same orientation" may refer to the graphical orientation position of the objects. Numerous other object types and characteristics are also within the scope of the present disclosure and those provided above are only provided by way of example.

Referring now to FIGS. 10-11, examples of optimized connectivity rules definition matrices are provided. In some embodiments, display process 10 may be configured to generate and deploy an optimized and flattened rules definition matrix. FIG. 10 shows a connectivity rules matrix for scalar power/ground net and FIG. 11 shows a connectivity rules matrix for an NC net.

In some embodiments, the rules definition matrix may be static and, in some cases, may be loaded once during program initialization. The rules definition matrix may include an optimum (sparse) multidimensional matrix with the first two dimensions as object types and rest of the dimensions as their influencing characteristics. One major optimization in the rules matrix has been achieved by including whitelisted rules. In addition to FIGS. 10-11, additional flattened rules definitions may be created for each connectivity object type as the primary key as discussed in further detail below.

Figure 12:
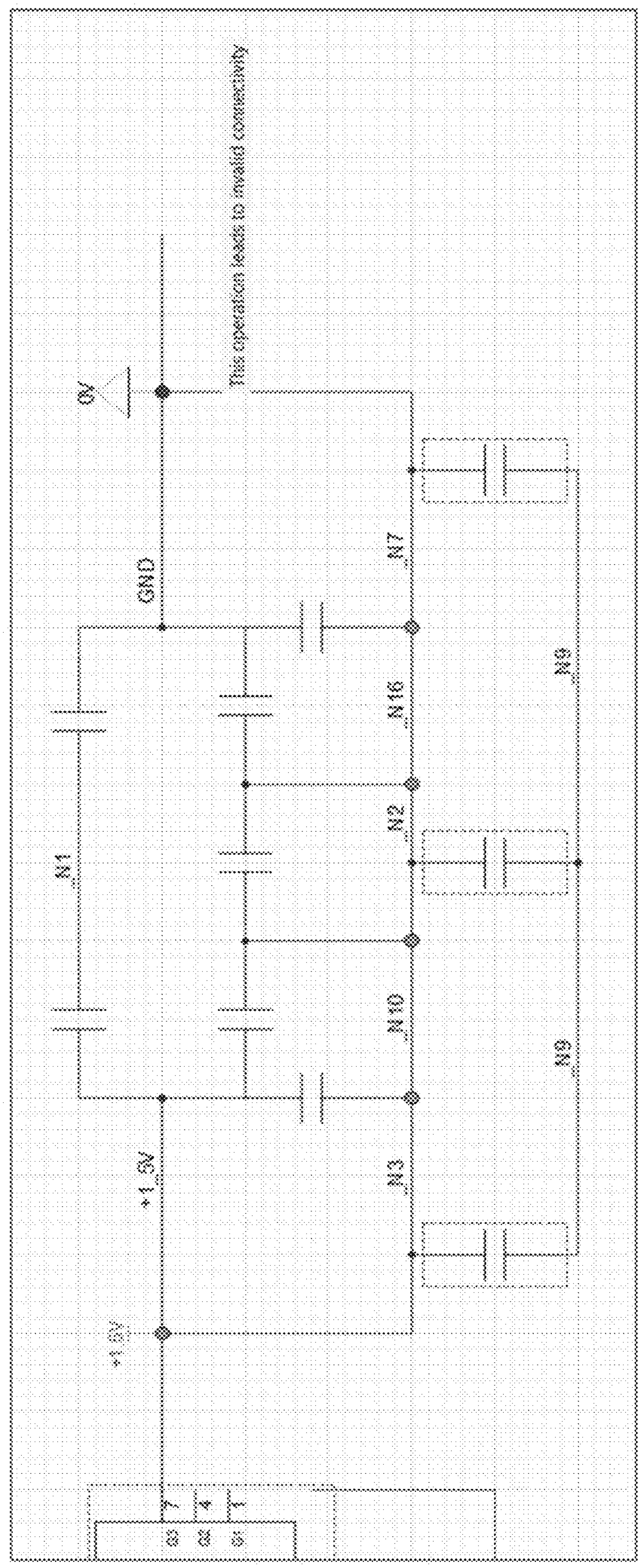
FIG. 12 is an illustration of a schematic of a display process according to an embodiment of the present disclosure.
Figure 13:
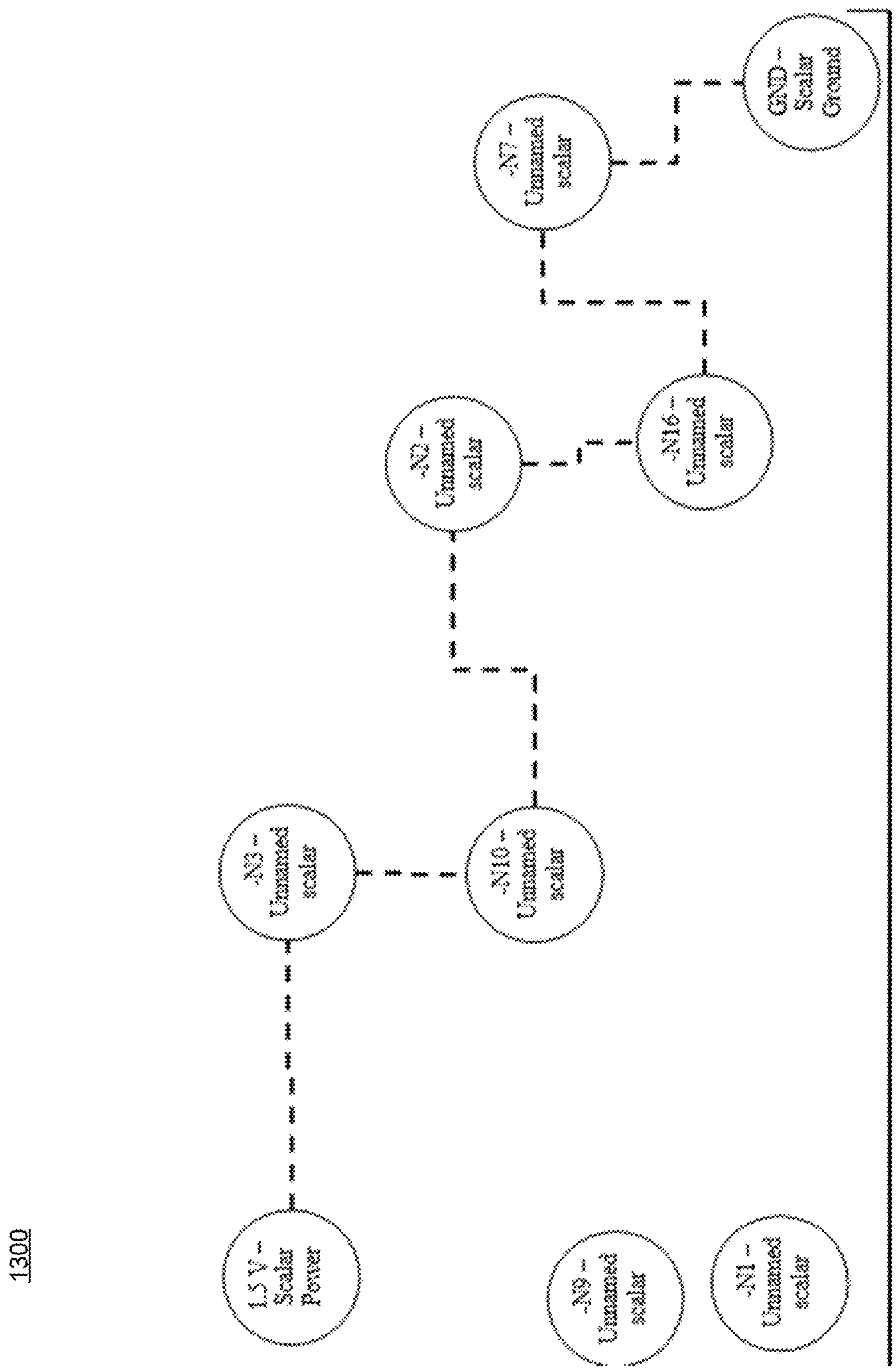
FIG. 13 is an illustration of a circuit graph according to an embodiment of the present disclosure.

Referring now to FIGS. 12-13, an example circuit 1200 and a circuit connectivity graph 1300 are provided. The example shown in FIG. 12 provides an example where display process 10 indicates that the current operation leads to invalid connectivity. In some embodiments, display process 10 may generate a circuit connectivity graph, which may involve all objects (in current operation) and their connections. Additionally and/or alternatively, display process 10 may add all existing as well as new connections being made in the current operation to the circuit connectivity graph. Each object node may contain only essential attributes.

Figure 14:
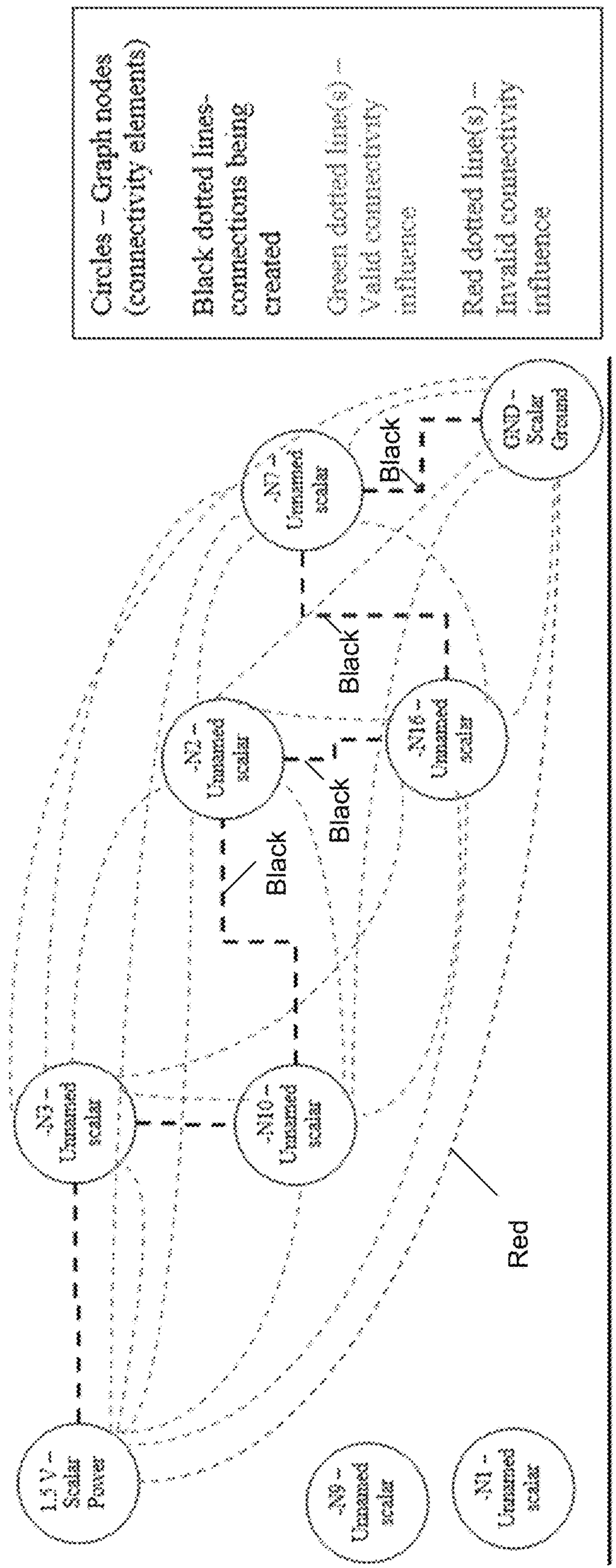
FIG. 14 is an illustration of a circuit graph according to an embodiment of the present disclosure.

Referring now to FIGS. 14-15, an example circuit connectivity graph 1400 and an influence matrix 1500 are provided. In some embodiments, the influence matrix may be computed by applying the optimized connectivity rules definition matrix on the circuit connectivity graph in an optimum way. In circuit connectivity graph 1400, circles may correspond to graph nodes (connectivity elements), black dotted lines may correspond to connections being created, green dotted lines may correspond to valid connectivity influence, and red dotted lines may correspond to invalid connectivity influence. In some embodiments, this may be performed just once for each candidate pair and in one iteration for maximum throughput. Display process 10 may calculate the relative characteristic per object pair just once. The connectivity graph influence computation may start with a pair of directly connected nodes and the graph computation may be carried with more directly connected nodes. During the graph computation process, each newly added node may perform its influence computation with all other directly or indirectly connected nodes of the graph thus building the complete influence matrix.

In some embodiments, and based on the computed influence matrix, a precedence rule may be applied to determine the final outcome and provide feedback to the circuit designer. The graphical and tabular views of an example computed influence matrix are shown in FIG. 15.

Figure 16:
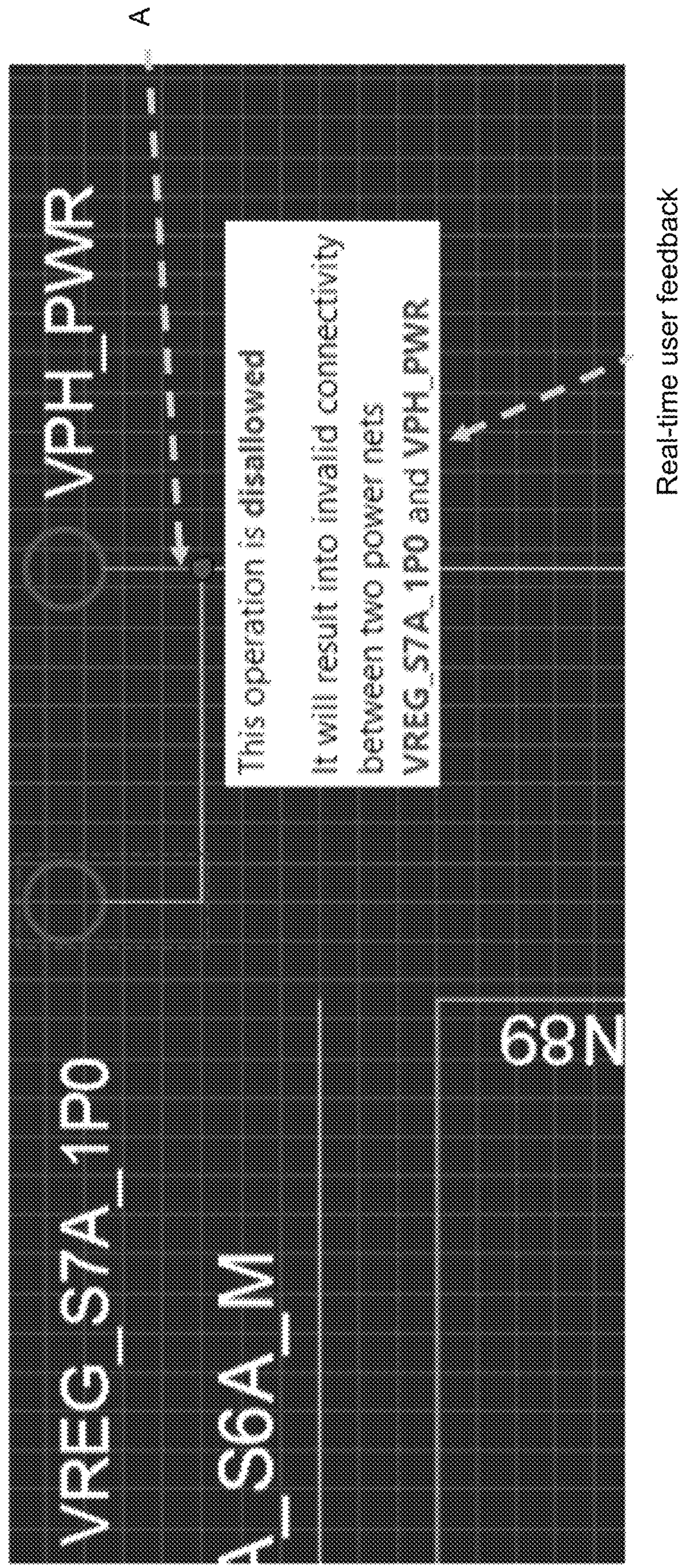
FIG. 16 is an illustration of a graphical user interface of a display process according to an embodiment of the present disclosure.
Figure 17:
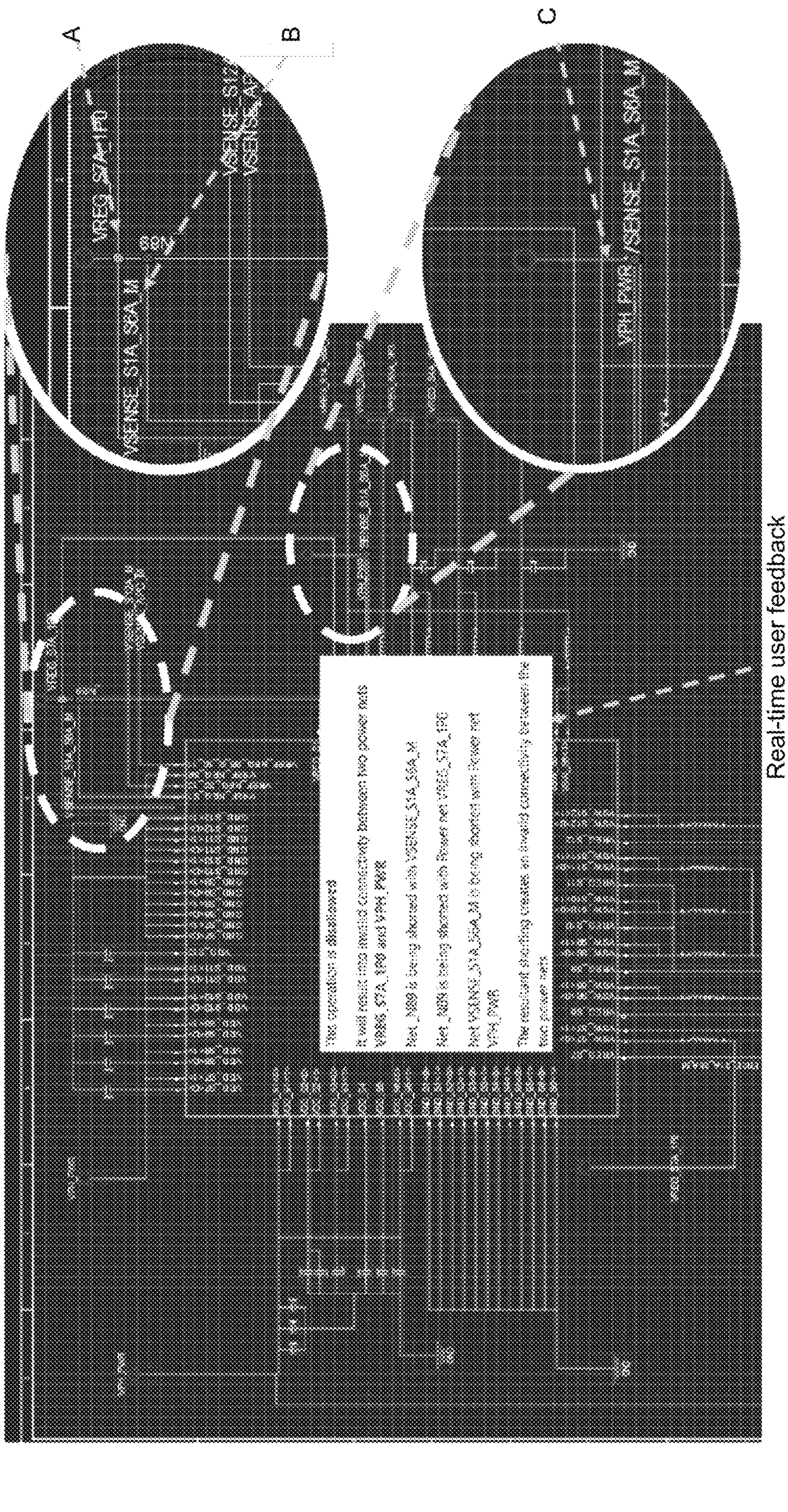
FIG. 17 is an illustration of a graphical user interface of a display process according to an embodiment of the present disclosure.
Figure 18:
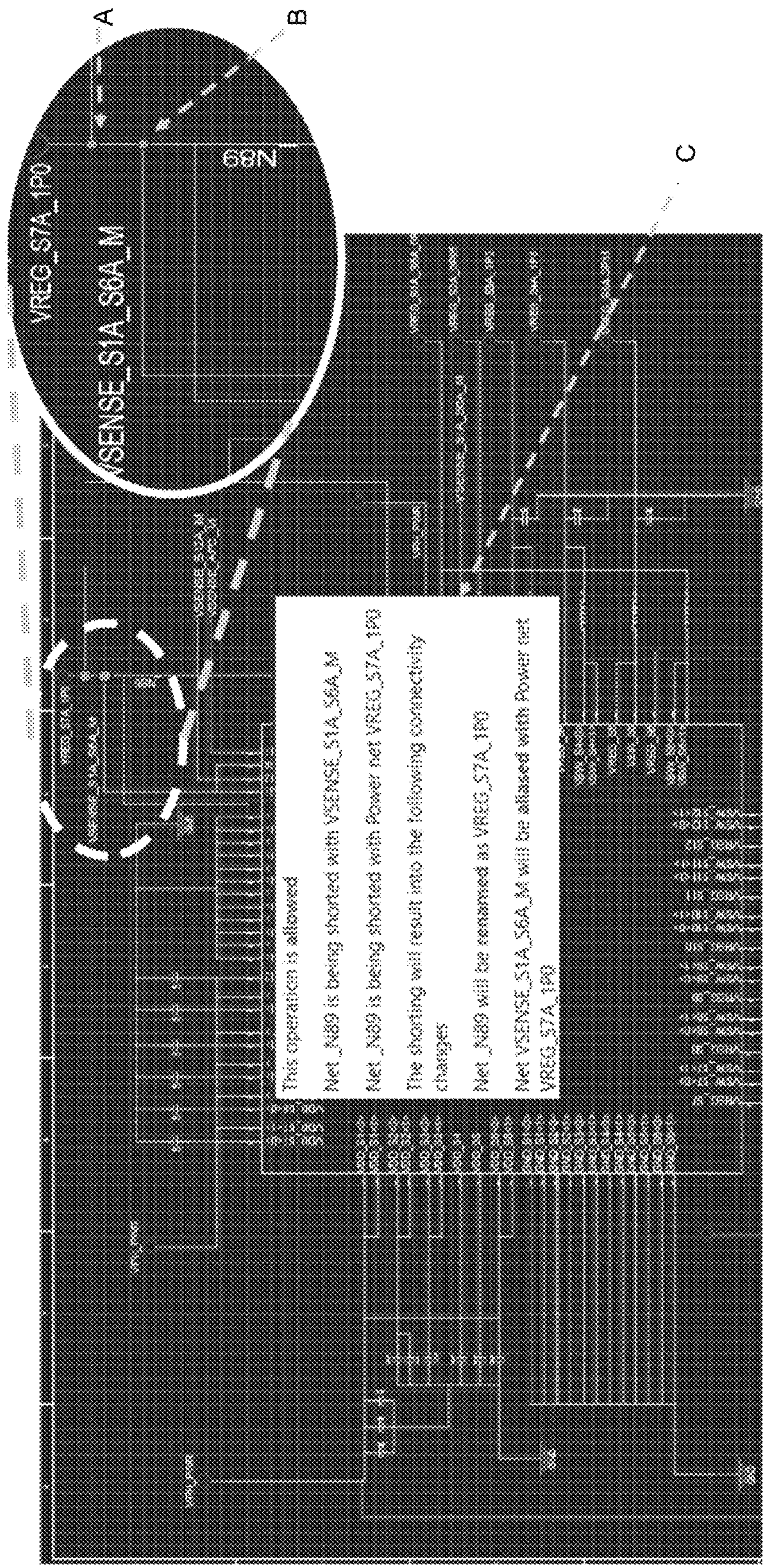
FIG. 18 is an illustration of a graphical user interface of a display process according to an embodiment of the present disclosure.

Referring now to FIGS. 16-18, examples consistent with embodiments of display process 10 are provided. FIG. 16 shows an example of an invalid connection case having only direct influence. In this particular example, an illegal connection is happening directly between two power nets VREG_S7A_1P0 and VPH_PWR during this action. Display process 10 may provide information to the user explaining why that particular operation is disallowed. Some existing tools also provide similar information for such direct influence cases as they are easy to calculate. Here, action A shows VPH_PWR being shorted with VREG_S7A_1P0 during a user operation.

FIG. 17 shows a more complex example of an invalid connection case having indirect influence. In this particular example, as a result of all of these connections happening simultaneously, an illegal connection is happening indirectly between two power nets VREG_S7A_1P0 and VPH_PWR during this user operation. Display process 10 may provide detailed information to the user (with visual feedback) why the action cannot be allowed by calculating all indirect influences in real-time and thus prohibits the accidental mistakes by the user. As shown in FIG. 17, action A shows _N89 being shorted with VREG_S7A_1P0 during an user action, action B shows _N89 also being shorted with VSENSE_S1A_S6A_M during the same user action, and action C shows VSENSE_S1A_S6A_M being shorted with VPH_PWR during the same user action.

FIG. 18 shows a more complex example of an valid connection case with all influence computation included. In this particular example, a rule of precedence may be applied while calculating the influence. The power net has higher precedence than a named net and an unnamed net. Named net has higher precedence than an unnamed net. In this example, _N89 has 2 influencers, namely VSENSE_S1A_S6A_M and VREG_S7A_1P0. Due to the precedence rule, _N89 may be renamed as power net VREG_S7A_1P0 and not as VSENSE_S1A_S6A_M. As shown in FIG. 18, action A shows _N89 also being shorted with VREG_S7A_1P0 during an user action and action B shows N89 being shorted with VSENSE_S1A_S6A_M during the same action. As a result of all of these connections happening simultaneously, a valid connection may be occurring between three nets during this action. Display process 10 may provide detailed information to the user (with visual feedback shown in C) about what may happen if the user performs this action. _N89 may be renamed as power net VREG_S7A_1P0 and also VSENSE_S1A_S6A_M will be aliased with VREG_S7A_1P0.

Figure 19:
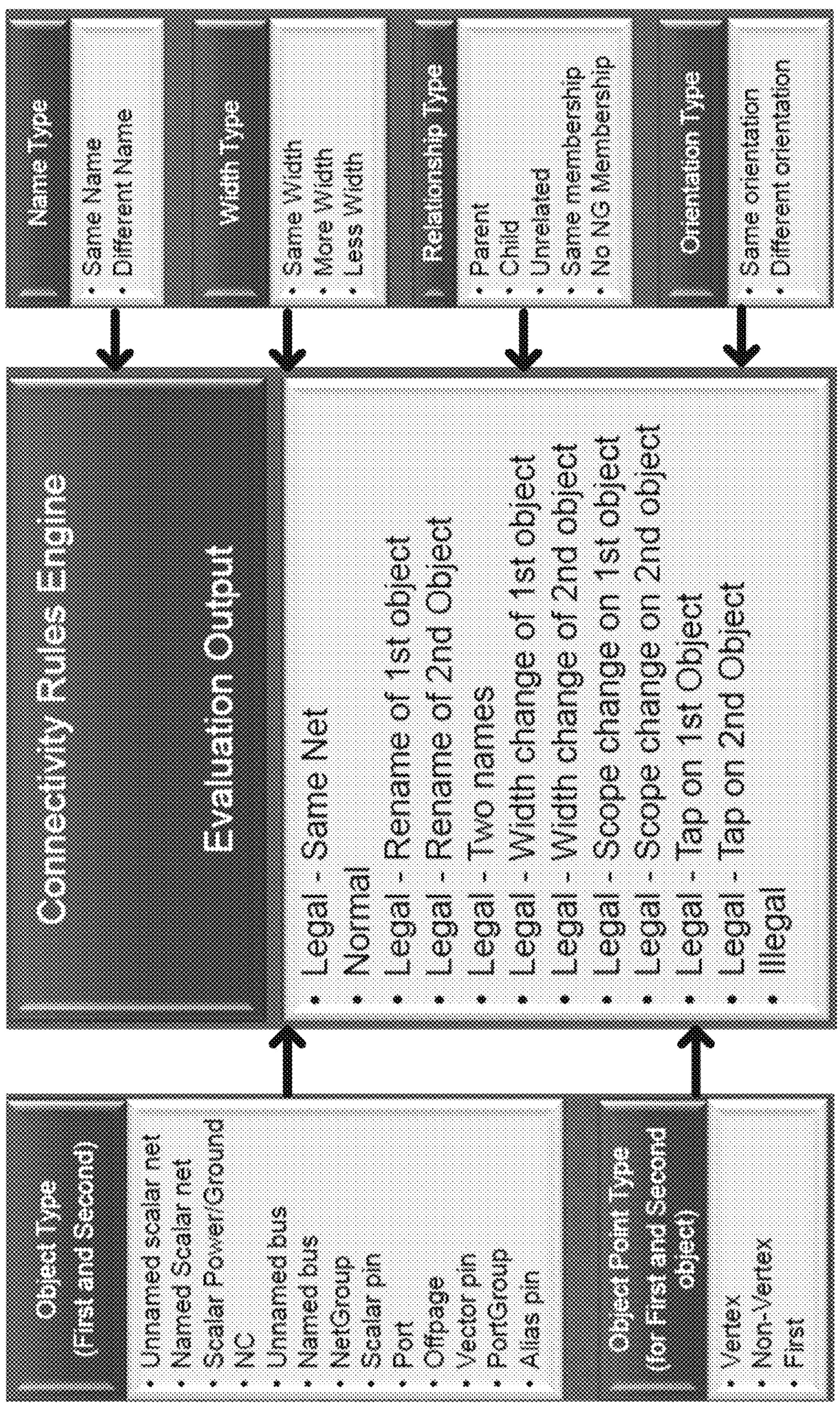
FIG. 19 is an illustration of a connectivity rules engine of a display process according to an embodiment of the present disclosure.

Referring now to FIGS. 19-31, examples of a connectivity rules engine and connectivity rules tables are provided. FIG. 19 shows an example of a connectivity rules engine, which may receive various object types and name types as shown in the Figure. FIG. 20 shows an example of a connectivity rules table for an unnamed scalar net. The object type unnamed scalar net may refer to a scalar net which has no name given by the circuit designer. FIG. 21 shows an example of a connectivity rules table for a named scalar net. The object type named scalar net may refer to a scalar net which has a name given by the circuit designer. FIG. 22 shows an example of a connectivity rules table for a scalar power/ground. The object types scalar power and ground may refer to power source elements in the schematic circuit. FIG. 23 shows an example of a connectivity rules table for an NC. The object type NC or noconnect may refer to a circuit element which can signify any other unconnected pin as in a valid state. FIG. 24 shows an example of a connectivity rules table for an unnamed bus. The object type unnamed scalar bus may refer to a vector net(bus) which has no name given by the circuit designer. FIG. 25 shows an example of a connectivity rules table for a named bus. The object type named bus may refer to a vector net(bus) which has a name given by the circuit designer. FIG. 26 shows an example of a connectivity rules table for a netgroup. The object type netgroup may refer to a collection of scalar and vector nets. FIG. 27 shows an example of a connectivity rules table for an unconnected scalar pin. The object type unconnected scalar pin may refer to a scalar pin which has no connection with any net. FIG. 28 shows an example of a connectivity rules table for an unconnected port. The object type unconnected port may refer to an interface port which has no connection with any net. FIG. 29 shows an example of a connectivity rules table for an unconnected offpage. The object types unconnected offpage may refer to a net connector object between two schematic sheets which has no connection with any net. FIG. 30 shows an example of a connectivity rules table for an unconnected vector pin. The object type unconnected vector pin may refer to a vector pin which has no connection with any net. FIG. 31 shows an example of a connectivity rules table for an unconnected alias pin. The object type unconnected alias pin may refer to an alias pin which can connect two nets but still unconnected with any net.

Embodiments of the display process described herein provide an approach for the real-time detection of valid or invalid connectivity shorts including indirect connections using an optimum and flattened rules definition optimally applied on a circuit to calculate the resultant influence. Additionally, the teachings of the present disclosure may provide real-time deterministic feedback to the designer even for extremely complex/dense circuits and uniformly for all types of simple and complex operations involving indirect connections.

In some embodiments, the display process described herein provides numerous advantages over existing approaches. Display process 10 may address the complex problem of determining indirect connections influence by applying the connectivity rules definition on the connectivity graph just by using their object types and their relative characteristics, which makes the process highly efficient and highly responsive. Existing approaches require time consuming extensive connectivity computations and yet still often fail to produce deterministic results due to order/sequence of computation. In contrast, display process 10 is deterministic and is not impacted at all by the sequence of computations or the operation type. Existing connectivity evaluation solutions do not scale well for new object types or characteristics additions or new definitions. Also, they do not scale well across multiple tools.

Embodiments of display process 10 provide a scalable way to solve the complex problem of indirect connection influence computation in real time, hence any IP violation could be easily detected from the EDA application's real-time response time and visual feedback while operating on complex circuits involving indirect connections. The detailed influence for both legal and illegal connections may be shown as visual feedback (e.g., tooltip/data-tip/messages, etc.) in real-time to the designer with the proposed solution, hence any violation of that could be easily detected from the user messages being shown to the designer in real-time for such dense/complex circuits and operations involving indirect connections.

It will be apparent to those skilled in the art that various modifications and variations can be made in the current estimation scheme and debugging process of embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for use with an electronic design comprising:

displaying, at a graphical user interface, at least a portion of the electronic design;

receiving, at the graphical user interface, a selection of a subcircuit at a first position of the graphical user interface;

in response to a user input, transitioning the subcircuit from the first position to a second position of the graphical user interface;

determining one or more direct and indirect connections resulting from a potential placement at the second position;

determining an influence metric by applying an optimized connectivity rules definition upon the potential placement at the second position and the one or more direct and indirect connections; and displaying feedback at the graphical user interface based upon, at least in part, the influence metric.

2. The computer-implemented method of claim 1, wherein displaying occurs before placement at the second position is finalized.

3. The computer-implemented method of claim 1, wherein the influence metric is associated with an influence matrix.

4. The computer-implemented method of claim 3, wherein the influence matrix is determined by applying the optimized connectivity rules definition on a circuit connectivity graph.

5. The computer-implemented method of claim 4, wherein the circuit connectivity graph includes all objects and connections involved in the transitioning of the subcircuit.

6. The computer-implemented method of claim 1, wherein the optimized connectivity rules definition is based upon, at least in part, one or more object types and one or more object characteristics.

7. The computer-implemented method of claim 1, wherein the feedback includes a valid placement notification or an invalid placement notification.

8. A computer-readable storage medium having stored thereon instructions, which when executed by a processor result in the following operations:

displaying, at a graphical user interface, at least a portion of the electronic design;

receiving, at the graphical user interface, a selection of a subcircuit at a first position of the graphical user interface;

in response to a user input, transitioning the subcircuit from the first position to a second position of the graphical user interface;

determining one or more direct and indirect connections resulting from a potential placement at the second position;

determining an influence metric by applying an optimized connectivity rules definition upon the potential placement at the second position and the one or more direct and indirect connections; and displaying a feedback at the graphical user interface based upon, at least in part, the influence metric.

9. The computer-readable storage medium of claim 8, wherein displaying occurs before placement at the second position is finalized.

10. The computer-readable storage medium of claim 8, wherein the influence metric is associated with an influence matrix.

11. The computer-readable storage medium of claim 10, wherein the influence matrix is determined by applying the optimized connectivity rules definition on a circuit connectivity graph.

12. The computer-readable storage medium of claim 11, wherein the circuit connectivity graph includes all objects and connections involved in the transitioning of the subcircuit.

13. The computer-readable storage medium of claim 8, wherein the optimized connectivity rules definition is based upon, at least in part, one or more object types and one or more object characteristics.

14. The computer-readable storage medium of claim 8, wherein the feedback includes a valid placement notification or an invalid placement notification.

15. A computing system for use in an electronic circuit design comprising:

at least one processor;

a graphical user interface that displays at least a portion of the electronic design and receives a selection of a subcircuit at a first position of the graphical user interface, wherein in response to a user input, the at least one processor transitions the subcircuit from the first position to a second position of the graphical user interface, the at least one processor determines one or more direct and indirect connections resulting from a potential placement at the second position, the at least one processor determines an influence metric by applying an optimized connectivity rules definition upon the potential placement at the second position and the one or more direct and indirect connections, the at least one processor generates feedback that is displayed at the graphical user interface based upon, at least in part, the influence metric.

16. The computing system of claim 15, wherein displaying occurs before placement at the second position is finalized.

17. The computing system of claim 15, wherein the influence metric is associated with an influence matrix.

18. The computing system of claim 17, wherein the influence matrix is determined by applying the optimized connectivity rules definition on a circuit connectivity graph.

19. The computing system of claim 18, wherein the circuit connectivity graph includes all objects and connections involved in the transitioning of the subcircuit.

20. The computing system of claim 15, wherein the optimized connectivity rules definition is based upon, at least in part, one or more object types and one or more object characteristics.

* * * * *